3,130,447
CONTINUOUS VULCANIZATION
Henry Karl and Walter F. Parsells, both of Middletown Township, N.J., assignors to Karparmursan Assoc., Inc., New York, N.Y., a corporation of New York
Filed Aug. 3, 1960, Ser. No. 47,214
16 Claims. (Cl. 18—6)

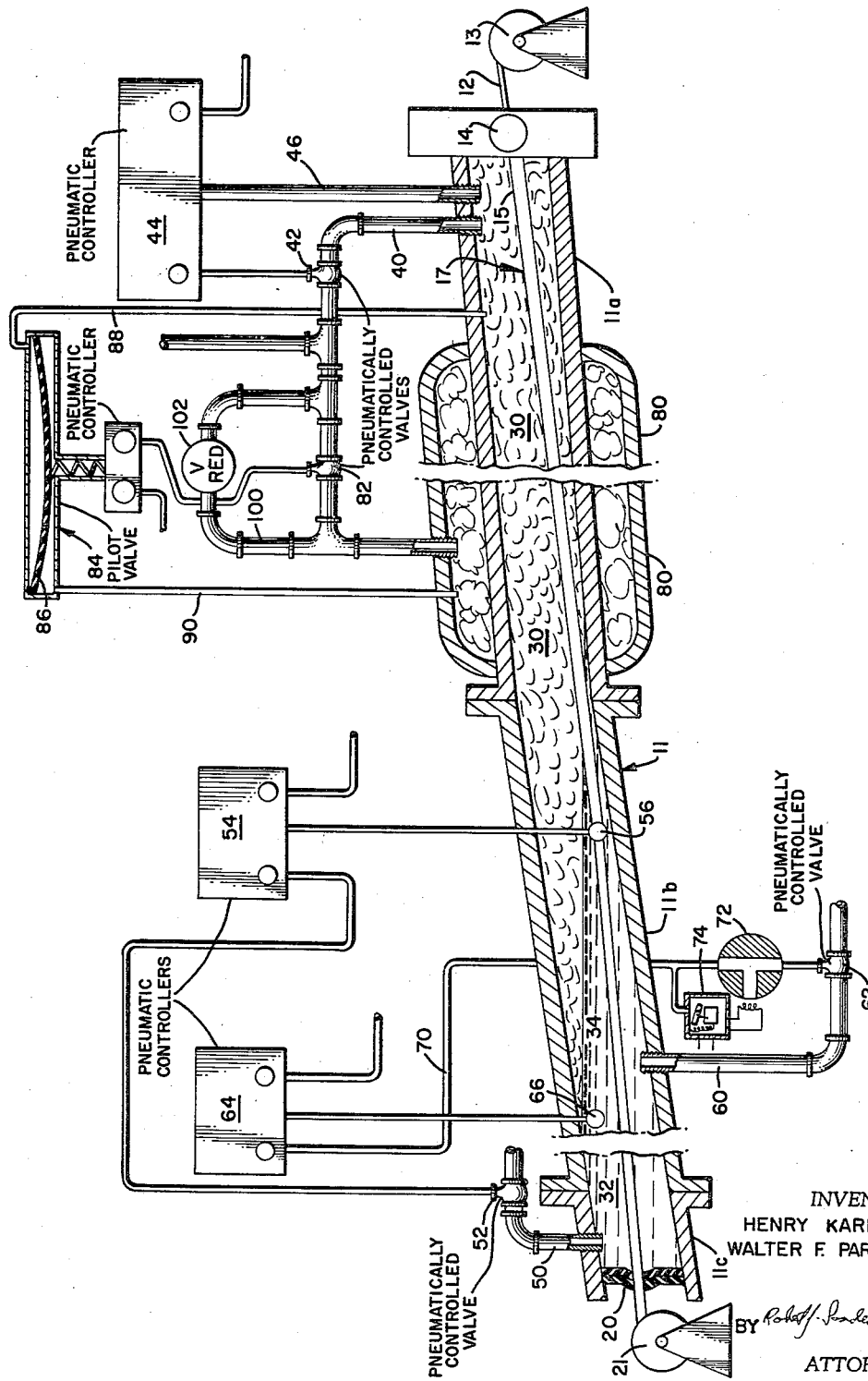

The present invention relates generally to the manufacture of elongated products through a curing process, and, more particularly, it is concerned with methods and apparatus suitable for the continuous vulcanization of products such as the insulation sheaths on electrical conductors or cables.

It is a general object of this invention to provide improved methods and apparatus for continuously curing an elongated object such as the insulating sheath of an electrical conductor or cable.

It is generally well known to manufacture insulated covered wires for use in the electrical industry by means of a continuous vulcanization process whereby the vulcanizable raw coating material, such as rubber, is continuously extruded onto the wire as it is passed into a vulcanizing chamber. The vulcanizing chamber ordinarily comprises a conduit, or pipe, of suitable length through which a wire carrying the coating to be vulcanized is passed and wherein an appropriate environment of temperature and pressure is maintained as the coated wire is passed therethrough.

The proper temperature and pressure for the curing process is ordinarily maintained through the use of steam supplied to the chamber at appropriate temperature and pressure. After passing through the vulcanizing chamber the coated wire is then passed into and through a cooling chamber which comprises a further conduit, or section of pipe, supplied with a coolant, ordinarily water, maintained under pressure corresponding to the pressure on the vulcanizing chamber. Commonly, the vulcanizing and cooling chambers comprise adjacent portions of a continuous conduit separated by a mechanical sealing means designed to permit the coated, vulcanized wire to pass from the vulcanizing chamber to the cooling chamber while at the same time serving as a means for maintaining the separation of steam and coolant in their respective chambers. A further mechanical seal is ordinarily provided at the outlet end of the cooling chamber in order to permit the wire with the vulcanized and cooled coating thereon to be drawn out of the cooling chamber onto a capstan while maintaining the coolant within its chamber. Such continuous vulcanizing processes are illustrated, for example, in U.S. Patents No. 2,291,344, granted July 28, 1942, to Samuel T. Powell, and No. 2,426,341, granted August 26, 1947, to C. M. Canfield.

The above-described system of continuous vulcanization utilizing mechanical seals between the vulcanizing and cooling chambers, as shown in the above-mentioned patents, although utilized commercially for many years, is subject to certain basic disadvantages resulting in a limitation on the rate of vulcanization and a very significant rejection rate of finished product. In illustration of certain of these basic disadvantages it should be known that the use of the mechanical seal between the vulcanizing and the cooling chambers has a frequent tendency to abrade and strip the hot, vulcanized insulating material from the wire under process thereby causing an unwanted build-up of insulating material in the vulcanizing chamber. The wire that has thus been stripped in passing through the seal is, of course, a reject for commercial use. Since this is an internal malfunction it cannot be observed by the operator until the affected portion of the wire has passed completely through the length cooling chamber and through the final seal and onto the take-up capstan. This malfunction, on occurrence, necessitates the shutting down of the machine and cleaning of the entire system, this, of course, causes costly production losses. When this occurs, it will be appreciated that the entire section of wire from the extrusion tip where the insulating material is applied to the wire on through both the vulcanizing and cooling chambers to the take-up capstan will be lost and the damaged section of wire may well involve some four to five hundred feet of wire on each occurrence. Such failures are most frequent, though by no means confined to, "start up" operations.

A further disadvantage of the mechanical seal system rests in the fact that it is almost impossible to maintain equal pressure on the steam and water in their respective chambers due to the variation in steam pressure required for different types of insulating material which require corresponding adjustment of the water pressure to bring the system into balance. When equal pressure cannot be maintained the imbalance creates several problems all of which increase production costs and rejection rates. Where imbalance occurs, mechanical seals being imperfect barriers, this permits either the steam to enter into the cooling area or water to enter into the steam area; either result is harmful and costly, for different reasons.

When steam enters the cooling chamber from the vulcanizing chamber through a leaky seal the soft vulcanized insulating material will not be properly cooled before it leaves the cooling chamber and enters the surrounding atmosphere. If this happens various harmful results can occur; for example, moisture which may have been trapped within the insulating material may, upon leaving the high pressure environment of the vulcanizing and cooling chambers, expands suddenly as steam thus causing a rupture in the insulating material with the resultant failure in its desired electrical properties. It is also true that improperly cooled, and thus soft, insulation material has a tendency to flatten out on the take-up reel or capstan.

When water enters the vulcanizing chamber from the cooling chamber it may displace part of the steam thus, in effect, reducing the predetermined length of the vulcanizing chamber resulting in incomplete vulcanization. Moreover, since the vulcanizing chamber is operated under conditions of relatively high temperature for a given pressure, by means of an outer, or surrounding, jacket containing steam under conditions of temperature and pressure higher than that of the vulcanizing chamber, the water entering the vulcanizing chamber will flash into steam causing a disturbance in the preselected temperature-pressure conditions. The undesirability of the last mentioned result will be appreciated when it is considered that the flashing steam absorbs a considerable amount of heat from the vulcanizing chamber, thus adversely tending to affect both the temperature and pressure conditions.

Various suggestions have been made in the past to overcome the disadvantages of the mechanical seal system by the use of methods or apparatus wherein the mechanical seal is eliminated and wherein the steam of the vulcanizing chamber is maintained in direct contact with the water of the cooling chamber in a continuous tube for both vulcanization and cooling. Various U.S. patents are of interest in this connection, for example, see U.S. 2,561,820, granted July 24, 1951, to J. H. Ramsey et al., U.S. 2,581,255, granted Jan. 1, 1952, to G. E. Henning, and U.S. 2,789,314, granted April 23, 1957, to B. H. Davis.

Despite various attempts to provide a continuous vulcanizing process without the use of a mechanical seal, never-the-less, these various attempts, as typified by the three (3) last-mentioned patents, have failed to provide an adequate solution to the problem. Among other things, these attempts involve method or apparatus wherein the hot steam of the vulcanizing chamber is in direct and immediate contact with the cold water of the coolant chamber and wherein no adequate means is provided for maintaining a dynamic equilibrium for the vulcanizing and cooling chambers as the coated wire is passed through the system.

It is a more specific object of the invention to provide improved apparatus for carrying out such a continuous vulcanization process wherein means are provided for automatically maintaining the desired vulcanization and cooling environments.

Accordingly, it is still another object of this invention to provide improved continuous vulcanization methods and apparatus which does not involve the use of a mechanical seal between the vulcanizing and cooling chambers.

Briefly stated, in accordance with the present invention, an improved continuous vulcanization process or system is provided wherein a dynamic equilibrium is provided for vulcanizing and cooling chambers without the use of mechanical seals therebetween. In accordance with this system the steam of the vulcanizing chamber and the cold water of the coolant chamber are separated by a dynamically controlled layer, or region, of hot water, hereinafter referred to as tempered water, so controlled by appropriate temperature sensing means.

The method of the invention may be advantageously carried out by means of novel apparatus comprising a generally horizontal conduit including a first portion comprising a vulcanizing chamber having means for introducing steam therein under conditions of predetermined temperature and pressure for carrying out a continuous vulcanizing process on a vulcanizable medium passed therethrough, and a second portion of said conduit comprising a cooling chamber having means for introducing therein a coolant fluid, and an outlet for withdrawing said fluid therefrom. The coolant chamber is situated at a slightly lower elevation than the vulcanizing chamber. Means are provided for continuously introducing the vulcanizable medium into the vulcanizing chamber and moving it through both the vulcanizing chamber and cooling chamber, in that order, and out of the cooling chamber through an appropriate sealing means which permits the vulcanized and cooled medium to pass into the external atmosphere while maintaining the cooling fluid thereon. Means are provided for controlling the rate at which the coolant is supplied to the coolant chamber comprising a temperature sensing means for determining the temperature of the fluid in the said coolant chamber. Means are provided for controlling the rate at which the coolant is withdrawn through said outlet comprising means for sensing the temperature of the fluid in said conduit at a point where the coolant is in admixture with condensed steam. Said two control means being adjusted to regulate the flow of coolant through a portion of said conduit at such rate as to maintain a predetermined region of hot water resulting from condensation of the steam in the vulcanizing chamber due to the coolant of the cooling chamber.

For additional objects and advantages and for a better understanding of the invention attention is now directed to the following description and accompanying drawings. The features of the invention which are believed to be novel are particularly pointed out in the appended claims.

In the drawing:

FIG. 1 is a schematic representation, partly in cross section, showing a continuous vulcanization apparatus embodying principles of the invention for applying an insulated coating to an electric cable.

Referring now to FIG. 1 of the drawing there is shown a continuous vulcanization system embodying principles of the invention comprising a horizontal type tuber 11, shown in cross-section which may be conveniently made up of a plurality of sections 11a, 11b, 11c of steel conduit or tubing joined end-to-end to provide the desired overall length. The diameter, wall thickness and length of the tubing may be determined in accordance with practices well known in the art for maintaining the temperature and pressure environment required for such processes, as hereinafter described in greater detail.

An electric cable or wire 12 is shown as it is fed from a source of supply, shown diagrammatically as a reel 13, and passing into means shown schematically, as an extruder 14 for continuously applying thereto a coating 15 of uncured insulating material 16 such as rubber and from whence the coated wire 17 passes into the horizontal tuber 11 where it is continuously cured and cooled in transit until it finally emerges through the outlet seal 20 and onto a take-up reel 21. The take-up reel 21, shown diagrammatically, is driven by suitable means (not shown) to draw the coated wire 17, through the tuber 11 from a supply reel 13 at a predetermined speed, which determines the time spent by each portion of the cable 17 in passing through the tuber 11. The region 30, within the right side of the tuber 11 as shown in the drawing, comprises the vulcanizing chamber of the system and the region 32, within the left side of the tuber 11 as shown in the drawing, comprises the cooling chamber of the system. The region 30 comprising the vulcanizing chamber contains steam under appropriate temperature and pressure to effect the vulcanizing process as the coated cable 17 passes therethrough. The region 32, comprising the cooling chamber is under the same pressure as the vulcanizing region 30 and contains a fluid coolant, ordinarily cold water, for cooling the vulcanized coating leaving the vulcanizing region before it passes through the outlet seal 20 to the lower external atmospheric pressure.

The region 34 between the vulcanizing region 30 and the cooling region 32 contains warm water at predetermined temperature, determined by the operation of the system as hereafter described in greater detail, and referred to herein as tempered water.

Though termed a horizontal type tuber, the tuber 11 is actually tilted slightly with respect to the horizontal plane so that the coolant chamber is slightly lower than the vulcanizing chamber such that a substantially horizontal water-steam interface defines the boundary of the vulcanizing region 34.

Steam under predetermined temperature and pressure conditions is introduced into the vulcanizing chamber by means of a steam inlet 40 from a steam source (not shown) under control of a steam inlet control valve 42 which is opened or closed or set at some intermediate position as determined by a pneumatic controller 44 which, in turn, is controlled by a pressure in the vulcanizing chamber as sensed by a conduit 46 which couples the vulcanizing chamber to the controller.

The cooling water is introduced into the cooling chamber by means of a water inlet conduit 50 shown leading into the top of the cooling chamber near the outlet end thereof. The rate at which the water is introduced into the cooling chamber is controlled by a water inlet valve 52 under the control of a first pneumatic controller 54 which, in turn, is under the control of a first temperature sensing means, shown as a temperature sensing bulb 56, located at a predetermined position in the tuber, hereinafter described in great detail.

In order to provide for circulation of the coolant through the coolant chamber a water outlet means shown as a drain pipe 60 at or near the under side of the tuber 11 is located at a predetermined distance from the water inlet conduit 50. The drain pipe 60 is provided with a water outlet valve 62 under the control of a second pneumatic controller 64 which, in turn, is controlled by a second temperature sensing means, shown as a temperature sensing bulb 66 located at another predetermined position in the tuber, as detailed below.

Both the first and second temperature sensing bulbs 56, 66 are positioned at substantially the same predetermined horizontal level or region within the tuber 11. As described below, this level determines the level of the layer or region of hot or tempered water between the steam of the vulcanizing chamber and the cooling water circulated through the cooling chamber. The first temperature sensing bulb 56 for controlling the water inlet flow rate is located generally toward the end of the tempered water region adjacent to the vulcanizing chamber end of the tuber. The second temperature sensing bulb for controlling the water outlet flow rate is located generally toward the end of the tempered water region adjacent the cooling chamber end of the tuber. The water outlet pipe 60 is near the bottom of the tuber 11 between the first and second temperature sensing bulbs 56, 66.

Means are provided for closing the water outlet valve 62 when the temperature sensed by the second temperature sensing bulb 66 reaches a predetermined upper value, as described hereinafter. This may be accomplished by reducing the pressure applied to the water outlet valve 62 when the pressure in the line 70 from the second pneumatic controller 64 reaches a predetermined upper limit as by means of a three-way solenoid-actuated valve 72 operated by a pressure-control device 74 sensitive to the pressure in the line 70 leading to the water outlet control valve 62 from the pneumatic controller 64, such as the apparatus marketed by the Minneapolis-Honeywell Regulator Company under the trademark "Pressuretrol."

In order to maintain the desired temperature condition in the vulcanizing chamber 30 an outer steam jacket 80 is provided around substantially the entire length of that portion of the tuber 11 defining the vulcanizing chamber 30. Steam is supplied to the outer jacket by means of a jacket inlet from the source (not shown) which also supplies the vulcanizing chamber 30.

In accordance with further novel aspects of the present invention, the steam supplied to the outer jacket 80 passes through a jacket inlet control valve 82 which, in turn, is under the control of a pilot valve 84, such as the Leslie Control Pilot. The pilot valve 84 controls the jacket inlet valve 82 in such manner as to assure that the steam pressure in the outer jacket 80 is maintained substantially equal to the steam pressure in the vulcanizing chamber 30. To accomplish this objective the pilot valve 84 includes a diaphragm 86 having one side coupled by a first conduit 88 to the vulcanizing chamber 30 and having the opposite or second side thereof coupled by a second conduit 90 to the outer jacket 80. The position of the diaphragm 86 is therefore controlled by the relative pressure of the vulcanizing chamber 30 and the outer jacket 80. Thus, when the steam pressure in the vulcanizing chamber 30 is equal to that of the outer jacket 80, the diaphragm 86 of the pilot valve 84 is caused to assume some intermediate or neutral position which, in turn, causes the jacket inlet valve 82 to assume some corresponding intermediate control position.

Means are provided to maintain a certain minimum steam pressure, saw of the order of fifty (50) pounds per square inch at say three hundred degrees (300°) F., on the outer jacket 80 during times when steam is not being supplied to the vulcanizing chamber 30, as for example during temporary shut downs. This prevents undue harmful contraction of the tuber 11 due to cooling thereof substantially below operating temperature ranges. This may be accomplished by means of a by-pass 100 around the jacket inlet valve 82. The by-pass conduit 100 includes a pressure reducing valve 102 adjusted and arranged to pass steam at the desired minimum pressure, but no higher. Thus, under normal operating conditions when steam pressure on the outer jacket 80 is above the desired minimum steam pressure the by-pass 100 does not affect the operation of the system.

We claim:

1. Apparatus for continuously vulcanizing an elongated medium comprising an elongated generally horizontal conduit including a first portion comprising a vulcanizing chamber having means for introducing steam therein under predetermined conditions of temperature and pressure, a second portion of said conduit comprising a cooling chamber adapted to contain a cooling fluid, said cooling chamber being situated at a slightly lower elevation than said vulcanizing chamber so that a portion of the steam of the vulcanizing chamber forms a substantially horizontal interface with a portion of the fluid of the cooling chamber below said steam, said cooling chamber including an outlet seal adapted and arranged to maintain the fluid in said chamber while permitting the vulcanized and cooled medium to pass therethrough, means for continuously introducing said vulcanizable medium into said vulcanizing chamber, means for moving said medium at a predetermined rate of travel through said vulcanizing chamber portion of the conduit and thence through said cooling chamber portion of the conduit and onward through said outlet seal to the exterior of said cooling chamber, means for passing a coolant fluid through said cooling chamber, means for continuously and independently of one another controlling the level of said interface and the rate at which said coolant fluid passes through said cooling chamber via said means for passing coolant through said chamber comprising temperature sensing means responsive to the temperature of the fluid at a predetermined level in said cooling chamber.

2. Apparatus for continuously vulcanizing an elongated medium comprising an elongated generally horizontal conduit including a first portion comprising a vulcanizing chamber having means for introducing steam therein under predetermined conditions of temperature and pressure, a second portion of said conduit comprising a cooling chamber adapted to contain a cooling fluid, said cooling chamber being situated at a slightly lower elevation than said vulcanizing chamber so that a portion of the steam of the vulcanizing chamber forms a substantially horizontal interface with a portion of the fluid of the cooling chamber below said steam, said cooling chamber including an outlet seal adapted and arranged to maintain the fluid in said chamber while permitting the vulcanized and cooled medium to pass therethrough, means for continuously introducing said vulcanizable medium into said vulcanizing chamber, means for moving said medium at a predetermined rate of travel through said vulcanizing chamber portion of the conduit and thence through said cooling chamber portion of the conduit and onward through said outlet seal to the exterior of said cooling chamber, means for passing a coolant fluid through said cooling chamber including inlet means for introducing therein a coolant fluid and outlet means for withdrawing said fluid from said cooling chamber, means for continuously and independently of one another controlling the level of said interface and the rate at which said coolant fluid passes through said cooling chamber via said means for passing coolant through said chamber comprising temperature sensing means responsive to the temperature of the fluid at a predetermined level in said cooling chamber.

3. Apparatus for continuously vulcanizing an elongated medium comprising an elongated generally horizontal conduit including a first portion comprising a vulcanizing chamber having means for introducing steam therein under predetermined conditions of temperature and pressure, a second portion of said conduit comprising a cooling chamber adapted to contain a cooling fluid, said cooling chamber being situated at a slightly lower elevation than said vulcanizing chamber so that a portion of the steam of the vulcanizing chamber forms a substantially horizontal interface with a portion of the fluid of the cooling chamber below said steam, said cooling chamber including an outlet seal adapted and arranged to maintain the fluid in said chamber while permitting the vulcanized and cooled medium to pass therethrough, means for continuously introducing said vulcanizable medium into said vulcanizing chamber, means for moving said medium at a predetermined rate of travel through said vulcanizing chamber portion of the conduit and thence through said cooling chamber portion of the conduit and onward through said outlet seal to the exterior of said cooling chamber, means for passing a coolant fluid through said cooling chamber including inlet means for introducing therein a coolant fluid and outlet means for withdrawing said fluid from said cooling chamber, means for continuously and independently of one another controlling the level of said interface and the rate at which said coolant fluid passes through said coolant chamber via said means for passing coolant through said chamber comprising first and second temperature sensing means responsive to the temperature of the fluid at first and second mutually spaced locations along the length of said conduit at substantially the same predetermined level in said cooling chamber.

4. Apparatus for continuously vulcanizing an elongated medium comprising an elongated generally horizontal conduit including a first portion comprising a vulcanizing chamber having means for introducing steam therein under predetermined conditions of temperature and pressure, a second portion of said conduit comprising a cooling chamber adapted to contain a cooling fluid, said cooling chamber being situated at a slightly lower elevation than said vulcanizing chamber so that a portion of the steam of the vulcanizing chamber forms a substantially horizontal interface with a portion of the fluid of the cooling chamber below said steam, said cooling chamber including an outlet seal adapted and arranged to maintain the fluid in said chamber while permitting the vulcanized and cooled medium to pass therethrough, means for continuously introducing said vulcanizable medium into said vulcanizing chamber, means for moving said medium at a predetermined rate of travel through said vulcanizing chamber portion of the conduit and thence through said cooling chamber portion of the conduit and onward through said outlet seal to the exterior of said cooling chamber, means for passing a coolant fluid through said cooling chamber including inlet means for introducing therein a coolant fluid and outlet means for withdrawing said fluid from said cooling chamber, means for continuously and independently of one another controlling the temperature of said coolant fluid and the level of said interface by controlling the rate at which said coolant fluid passes through said cooling chamber comprising first temperature sensing means operatively coupled to said inlet means and second temperature sensing means operatively coupled to said outlet means, said first and second temperature sensing means being respectively responsive to the temperature of the fluid at a predetermined level in said cooling chamber.

5. Apparatus for continuously vulcanizing an elongated vulcanizable medium comprising an elongated generally horizontal conduit including a first portion comprising a vulcanizing chamber having means for introducing steam therein under predetermined conditions of temperature and pressure, a second portion of said conduit comprising a cooling chamber adapted to contain a cooling fluid, said cooling chamber being situated at a slightly lower elevation than said vulcanizing chamber so that a portion of the steam of the vulcanizing chamber forms a substantially horizontal interface with a portion of the fluid of the cooling chamber below said steam, said cooling chamber including an outlet seal adapted and arranged to maintain the fluid in said chamber while permitting the vulcanized and cooled medium to pass therethrough, means for continuously introducing said vulcanizable medium into said vulcanizing chamber, means for moving said medium at a predetermined rate of travel through said vulcanizing chamber portion of the conduit and thence through said cooling chamber portion of the conduit and onward through said outlet seal to the exterior of said cooling chamber, means for passing a coolant fluid through said cooling chamber including inlet means for introducing therein a coolant fluid and outlet means for withdrawing said fluid from said cooling chamber, means for continuously and independently of one another controlling the temperature of said coolant fluid and the level of said interface by controlling the rate at which said coolant fluid passes through said cooling chamber comprising first temperature sensing means operatively coupled to said inlet means and second temperature sensing means operatively coupled to said outlet means, said first and second temperature sensing means being respectively responsive to the temperature of the fluid at a predetermined level in said cooling chamber, said first temperature sensing means responsive location being more remote from said fluid coolant inlet location than said second temperature sensing means location.

6. Apparatus as defined in claim 5 wherein said fluid coolant inlet location is in the general vicinity of the outlet seal of said coolant chamber, wherein said second temperature sensing means responsive location is generally intermediate said fluid coolant inlet location and said fluid coolant outlet location.

7. Apparatus as defined in claim 6 wherein the vulcanizable medium is the sheath of an electric cable and wherein the means for introducing said medium into the vulcanizing chamber includes an extruder for applying the uncured medium to the cable.

8. Apparatus as defined in claim 6 wherein means are provided for automatically closing the outlet means in response to a predetermined upper temperature value sensed by said second temperature sensing means.

9. Apparatus as defined in claim 1 wherein said vulcanizing chamber is substantially surrounded by a steam jacket, and which further comprises means including a conduit having an inlet control valve for supplying steam to said jacket, means for equalizing the steam pressure in said jacket with the steam pressure of the vulcanizing chamber including a pilot valve responsive to the respective steam pressures in said chamber and jacket and being operatively coupled to said inlet control valve for automatically adjusting the position of the said valve for pressure equalization in said jacket with said chamber.

10. In a continuous vulcanization system including a vulcanization chamber having means for introducing steam therein under predetermined conditions of temperature and pressure and wherein said vulcanizing chamber is substantially surrounded by a steam jacket, and which further comprises means including a conduit having an inlet control valve for supplying steam to said jacket, means for equalizing the steam pressure in said jacket with the steam pressure of the vulcanizing chamber including a pilot valve having a first input operatively coupled to said vulcanization chamber and a second input operatively coupled to said steam jacket and having output means responsive to the respective steam pressures in said chamber and jacket as coupled thereto via said first and second inputs respectively, said output means being operatively coupled to said inlet control valve for automatically adjusting the position of the said inlet control valve for controlling the flow of steam to said jacket through said conduit, in order to provide pressure equalization of the steam in said jacket with the steam in said chamber.

11. Apparatus as defined in claim 10 further comprising a by-pass conduit around said inlet control valve, said by-pass conduit including a pressure reducing valve adjusted and arranged to pass steam only below a predetermined minimum pressure, said minimum pressure being substantially below the normal minimum operating steam pressure in said jacket, whereby said minimum steam pressure is maintained in said jacket during non-operating intervals.

12. Apparatus for continuously vulcanizing an elongated medium comprising an elongated generally horizontal conduit including a first portion comprising a vulcanizing chamber having means for introducing steam therein under predetermined conditions of temperature and pressure, a second portion of said conduit comprising a cooling chamber adapted to contain a cooling fluid, said cooling chamber being situated at a slightly lower elevation than said vulcanizing chamber so that a portion of the steam of the vulcanizing chamber forms a substantially horizontal interface with a portion of the fluid of the cooling chamber below said steam, said cooling chamber including an outlet seal adapted and arranged to maintain the fluid in said chamber while permitting the vulcanized and cooled medium to pass therethrough, means for continuously introducing said vulcanizable medium into said vulcanizing chamber, means for moving said medium at a predetermined rate of travel through said vulcanizing chamber portion of the conduit and thence through said cooling chamber portion of the conduit and onward through said oulet seal to the exterior of said cooling chamber, means for passing a coolant fluid through said cooling chamber including inlet means for introducing therein a coolant fluid and outlet means for withdrawing said fluid from said cooling chamber, first sensing means sensitive to the level of said interface and operatively coupled to the said inlet means for controlling the amount of fluid introduced into said coolant chamber, and second sensing means sensitive to the temperature of said coolant in said cooling chamber and operatively coupled to said outlet means for controlling the amount of fluid withdrawn from said cooling chamber.

13. Apparatus as defined in claim 12 wherein said first sensing means comprises a temperature sensitive element responsive to temperature variations due to changes in the level of said interface.

14. Apparatus as defined in claim 12 wherein said coolant inlet means includes a fluid inlet conduit for introducing coolant fluid into said cooling chamber at an inlet location in the general vicinity of the outlet seal of said cooling chamber, wherein said fluid coolant outlet means includes a fluid outlet conduit for withdrawing fluid from said cooling chamber at an outlet location spaced a predetermined distance further away from said outlet seal than said inlet location, and wherein said second sensing means sensitive to the temperature of said coolant comprises a temperature sensitive element located generally intermediate said inlet location and said outlet location.

15. Apparatus as defined in claim 12 wherein means are provided for automatically closing the outlet means in response to a predetermined upper temperature value sensed by said second sensing means.

16. Apparatus for continuously vulcanizing an elongated medium comprising an elongated generally horizontal conduit including a first portion comprising a vulcanizing chamber having means for introducing steam therein under predetermined conditions of temperature and pressure, a second portion of said conduit comprising a cooling chamber adapted to contain a cooling fluid, said cooling chamber being situated at a slightly lower elevation than said vulcanizing chamber so that a portion of the steam of the vulcanizing chamber forms a substantially horizontal interface with a portion of the fluid of the cooling chamber below said steam, said cooling chamber including an outlet seal adapted and arranged to maintain the fluid in said chamber while permitting the vulcanized and cooled medium to pass therethrough, means for continuously introducing said vulcanizable medium into said vulcanizing chamber, means for moving said medium at a predetermined rate of travel through said vulcanizing chamber portion of the conduit and thence through said cooling chamber portion of the conduit and onward through said outlet seal to the exterior of said cooling chamber, means for simultaneously maintaining said interface at a predetermined level and for maintaining the temperature of said coolant in said coolant chamber in a predetermined operating range comprising inlet means for introducing coolant fluid into said coolant chamber and outlet means for withdrawing fluid from said coolant chamber, sensing means for continuously monitoring the level of said interface and the temperature of the fluid in said coolant chamber, and control means operatively coupled to said sensing means and responsive thereto for controlling the introduction of coolant into said coolant chamber via said inlet means at a rate which is a function of the level of said interface and withdrawing fluid from said coolant chamber via said outlet means at a rate which is a function of the temperature of the fluid in said coolant chamber, thereby to maintain dynamically controlled separation of the steam in the vulcanizing chamber and fluid in the coolant chamber.

References Cited in the file of this patent

UNITED STATES PATENTS

| | | |
|---|---|---|
| 1,732,200 | Chadwick et al. | Oct. 15, 1929 |
| 1,885,080 | Cherry et al. | Oct. 25, 1932 |
| 2,561,820 | Ramsey et al. | July 24, 1951 |
| 2,581,255 | Henning | Jan. 1, 1952 |
| 2,683,285 | Ramsey | July 13, 1954 |
| 2,789,314 | Davis | Apr. 23, 1957 |